TELEVISION TYPE FACSIMILE TRANSMISSION SYSTEM

Filed Dec. 11, 1948 5 Sheets-Sheet 1

Inventor
JOHN HAYS HAMMOND, JR.
By [signature]
Attorney

Oct. 20, 1953 J. H. HAMMOND, JR 2,656,412

TELEVISION TYPE FACSIMILE TRANSMISSION SYSTEM

Filed Dec. 11, 1948 5 Sheets-Sheet 2

Inventor
JOHN HAYS HAMMOND, JR.

By [signature]

Attorney

INVENTOR
JOHN HAYS HAMMOND, JR.
BY
Olin J. Mitchell
ATTORNEY

TELEVISION TYPE FACSIMILE TRANSMISSION SYSTEM

Filed Dec. 11, 1948 5 Sheets-Sheet 4

INVENTOR
JOHN HAYS HAMMOND, JR.
BY
Olin J. Mitchell
ATTORNEY

Oct. 20, 1953 J. H. HAMMOND, JR 2,656,412

TELEVISION TYPE FACSIMILE TRANSMISSION SYSTEM

Filed Dec. 11, 1948 5 Sheets-Sheet 5

INVENTOR
JOHN HAYS HAMMOND, JR.
BY
[signature]
ATTORNEY

Patented Oct. 20, 1953 2,656,412

UNITED STATES PATENT OFFICE 2,656,412

TELEVISION TYPE FACSIMILE TRANSMISSION SYSTEM

John Hays Hammond, Jr., Gloucester, Mass.

Application December 11, 1948, Serial No. 64,807

8 Claims. (Cl. 178—6.7)

This invention relates to television systems and more specifically to a system for transmitting news by television on a predetermined time schedule.

Features of the invention include means in connection with a standard television system for scanning and transmitting news sheets and also for transmitting a plurality of characteristic control signals which operate means at the receiver to cause the direct vision kinescope tube to be rotated into line with the camera, to cause the news sheets to be photographed in rapid succession and to cause the film to be processed at a retarded rate after which the printed film is placed in position to be torn off and used as news sheets.

Means is also provided for transmitting a special signal at the end of the newcast which will shut off the photographing apparatus at the receiver, but will allow the processing mechanism to continue in operation until all the news films have been processed.

The invention also consists in certain new and original features of construction and combinations of parts hereinafter set forth.

Figure 1:
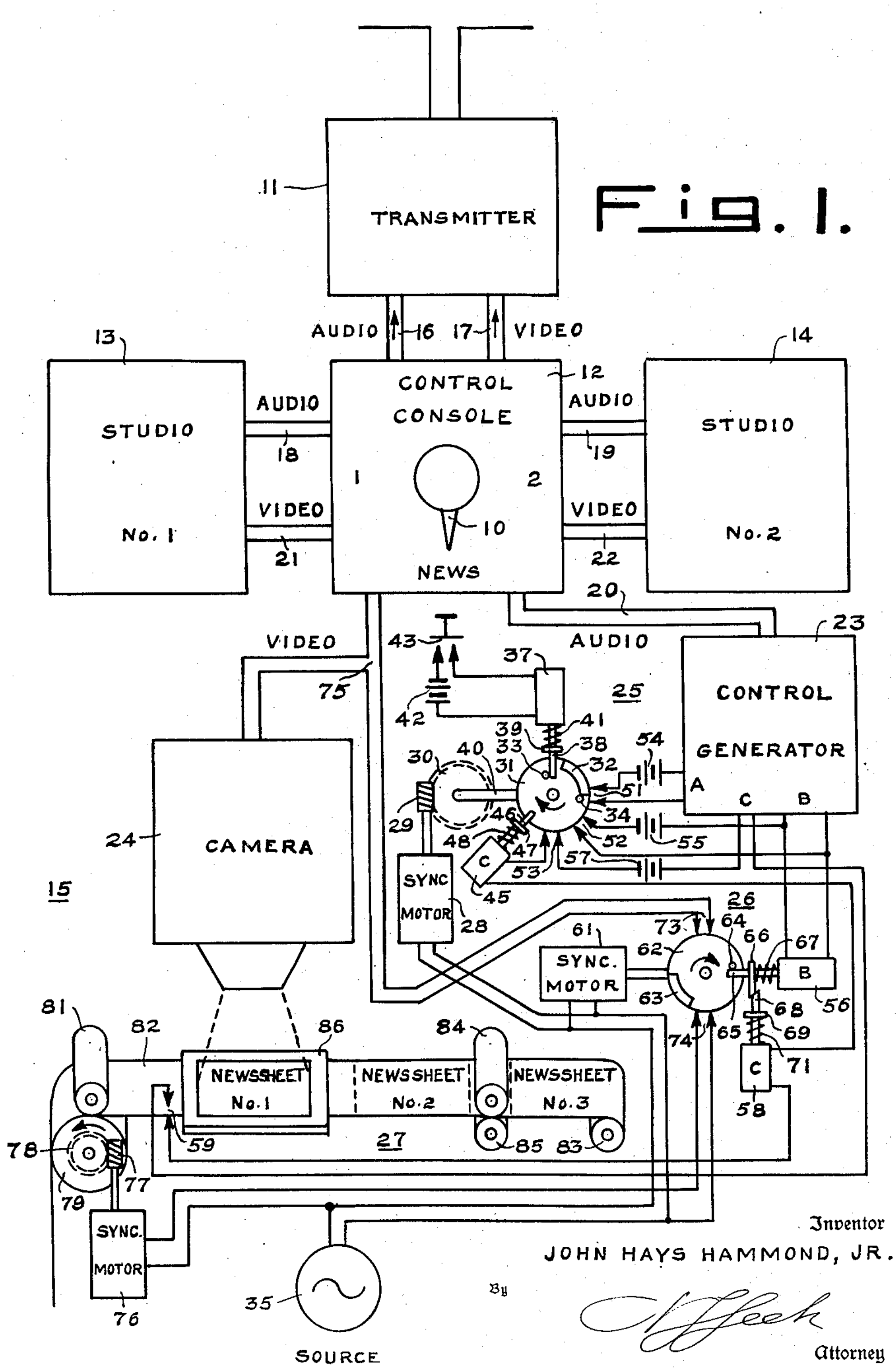
Figure 2:
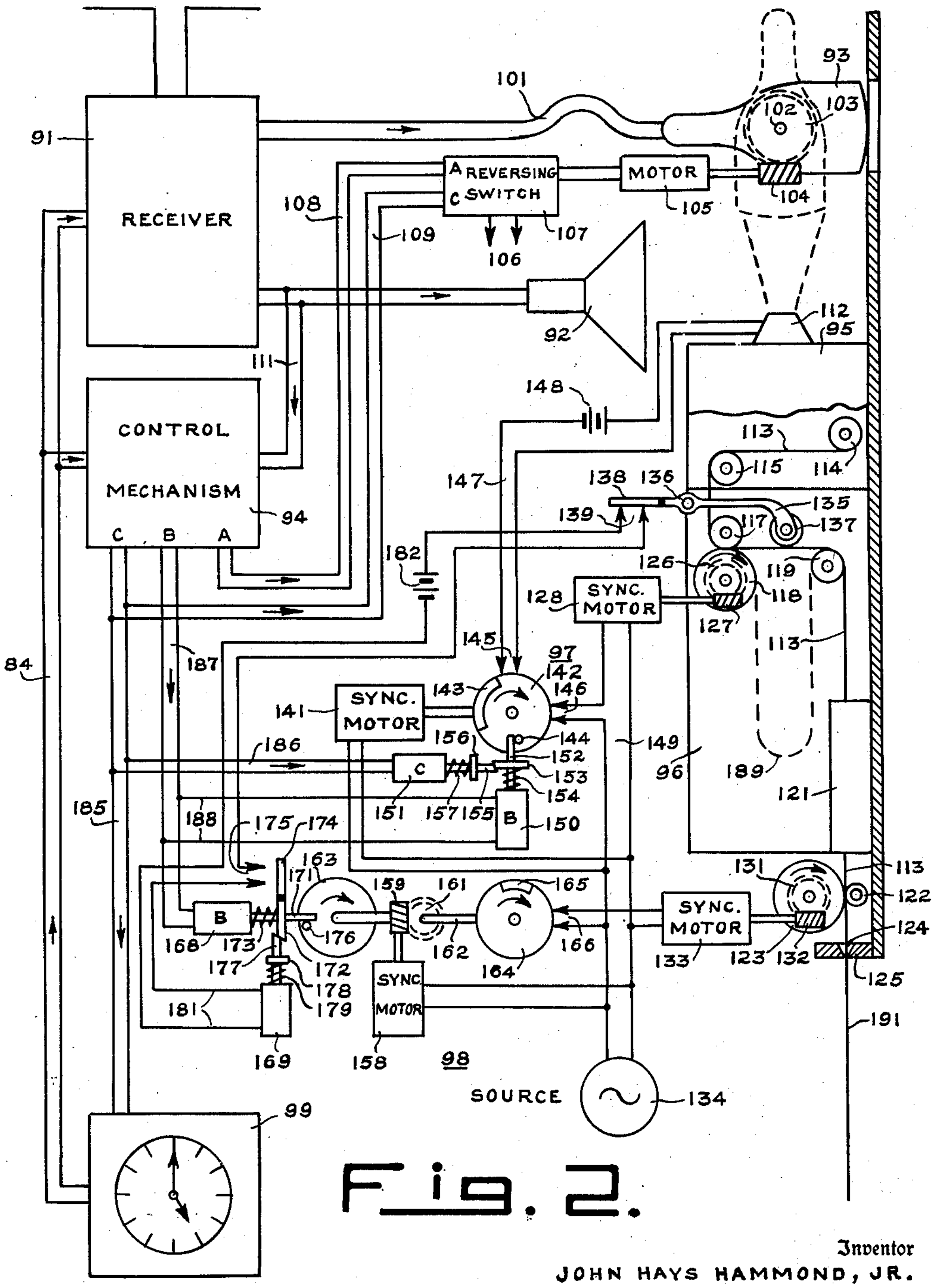

The nature of the invention, as to its objects and advantages, the mode of its operation and the manner of its organization, may be better understood by referring to the following description, taken in connection with the accompanying drawings forming a part thereof, in which Fig. 1 is a schematic diagram of a television transmitting system constructed in accordance with the invention, Fig. 2 is a schematic diagram of a television receiving system used in connection with the transmitting system shown in Fig. 1.

Figure 3:
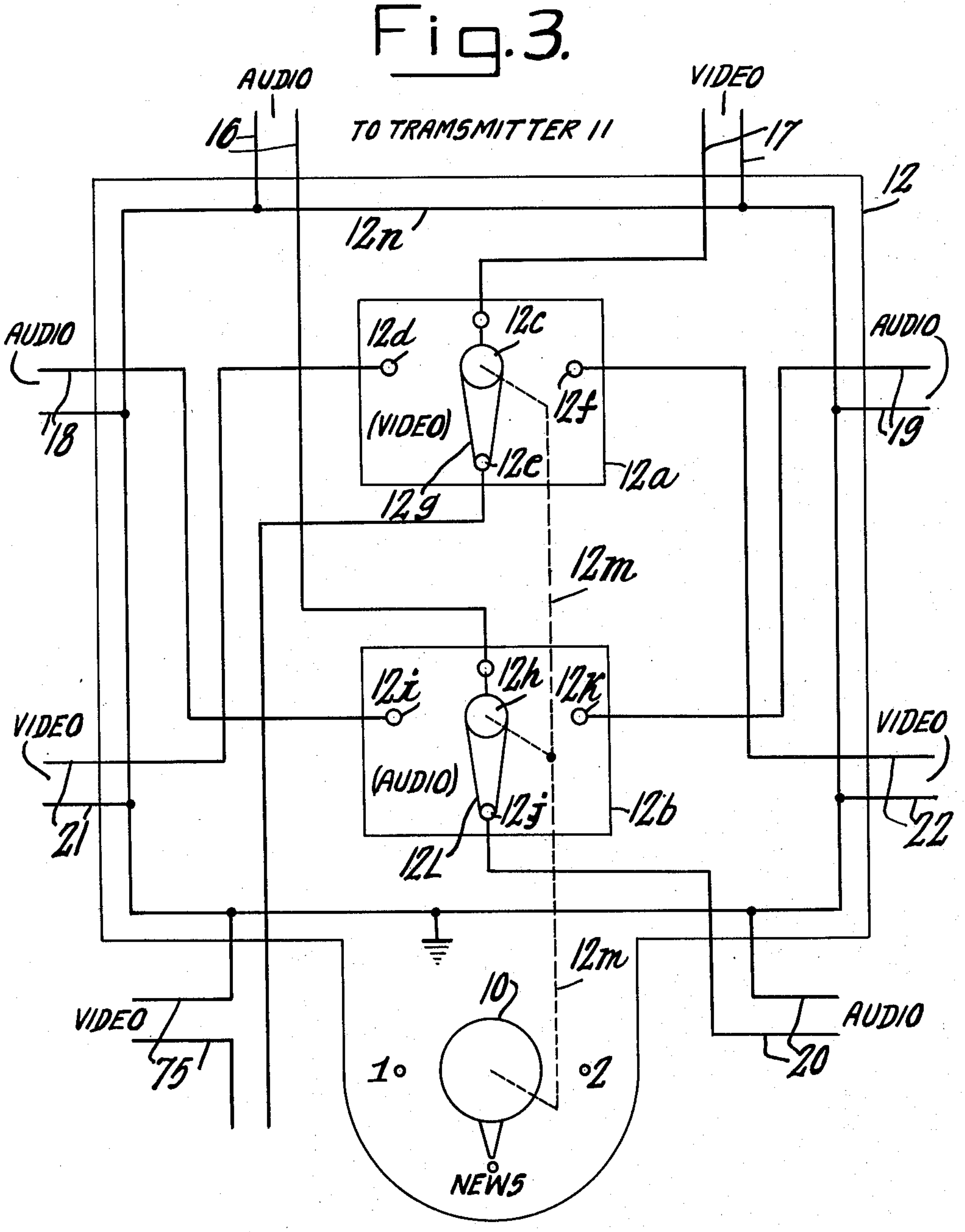
Figure 4:
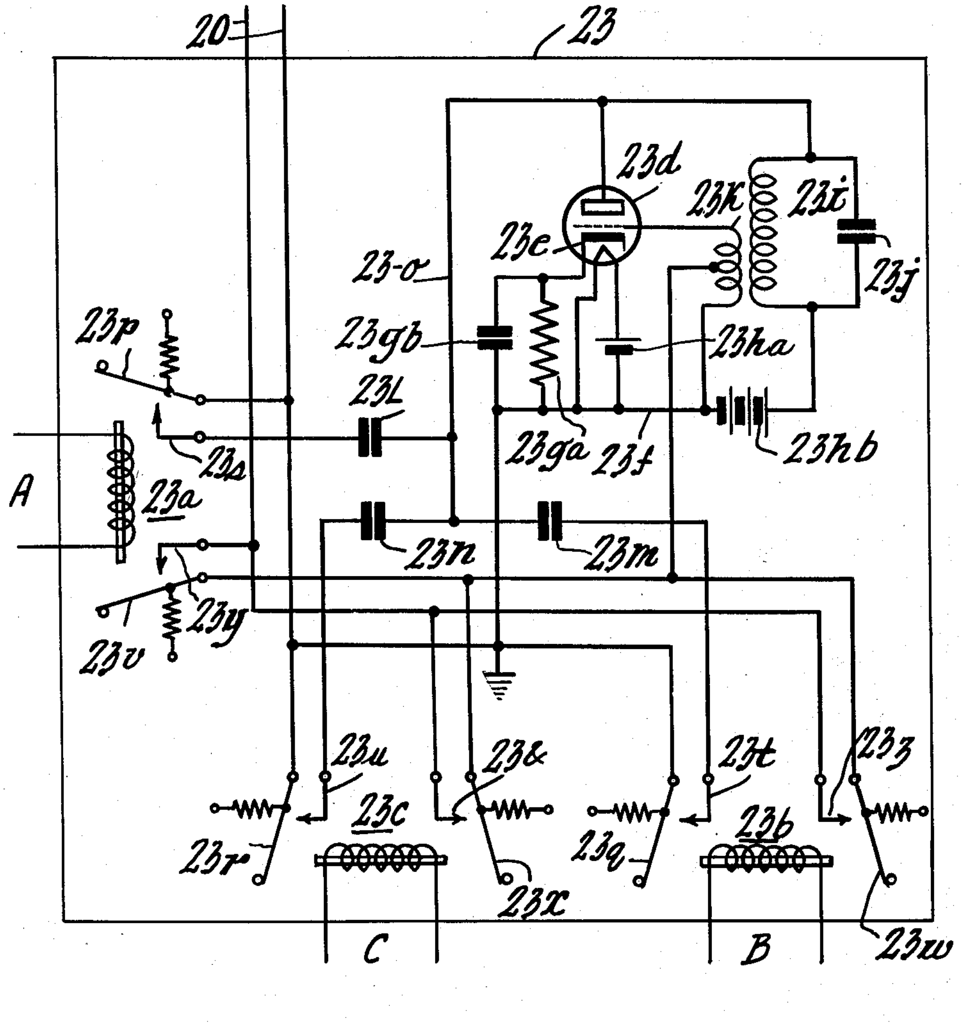
Figure 5:
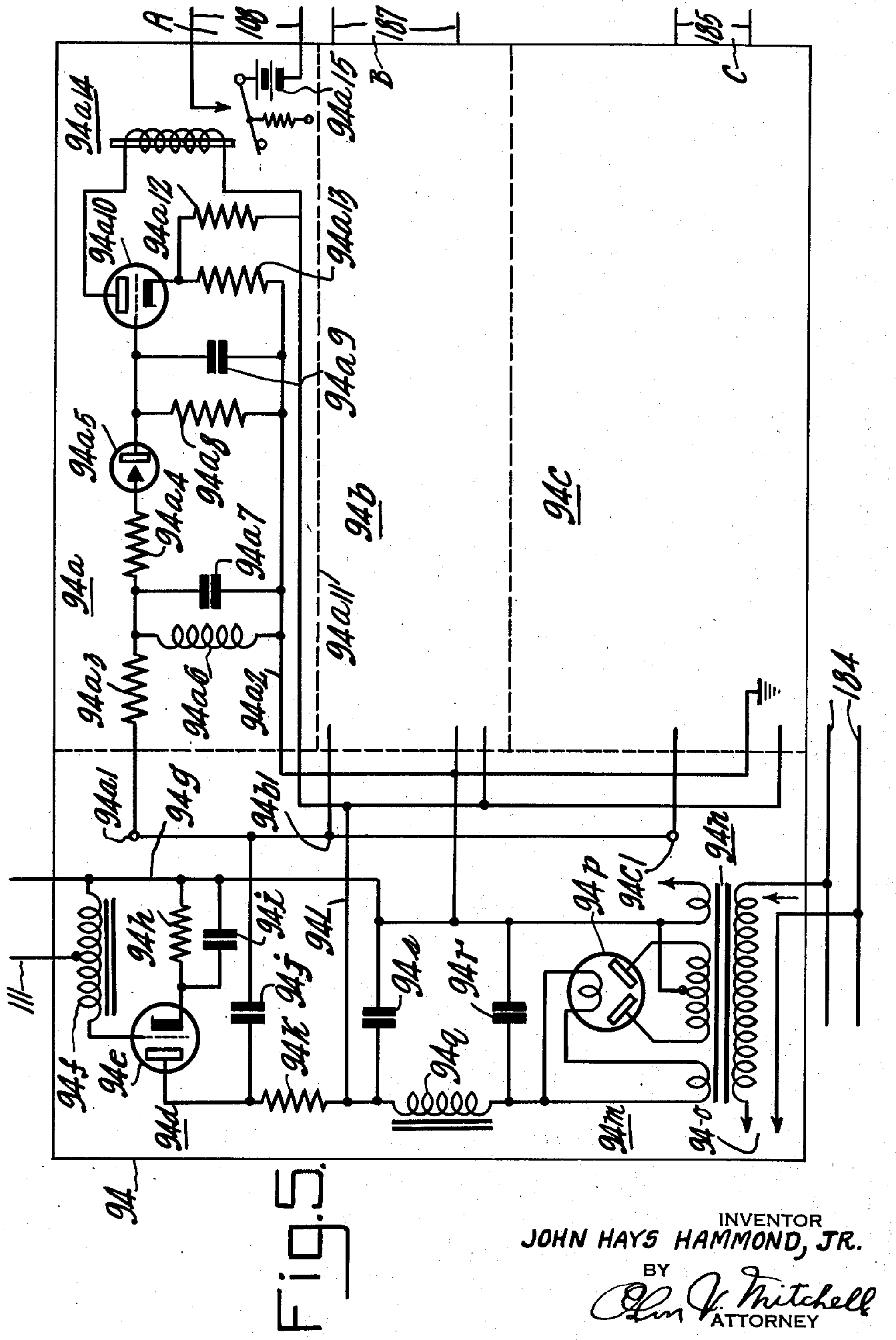

Fig. 3 is a diagrammatic showing of a known control console suitable for use in practicing the invention, Fig. 4 is a diagrammatic showing of a control generator embodying known apparatus suitable for use in practicing the invention, and Fig. 5 is a diagrammatic showing of a known type of control mechanism suitable for use in practicing the invention.

In the following description, parts will be identified by specific names for convenience, but they are intended to be generic in their application to similar parts.

Referring to the drawings and more particularly to Fig. 1, the transmission system consists of a standard television transmitter 11, a control console 12, two studios 13 and 14 and a news room 15. The control console 12, which is provided with an indicator 10, is connected to the transmitter 11 by an audio channel 16 and a video channel 17 and to the two studios 13 and 14 by audio channels 18 and 19 and video channels 21 and 22 respectively.

The control console 12 (Fig. 3) may be of any suitable kind and is a switching device for connecting both the video and the audio output of the No. 1 studio 13, the No. 2 studio 14 or the news room 15 to the video and the audio lines running to the transmitter 11, in a selective manner.

The console 12 is shown by way of example as having a two-section triple throw switch of standard construction with a video switch section 12a and an audio switch section 12b. This switch may be of a commercially available type, such for example, as a Mallory No. 1323L. The section 12a has a central or common contact 12c and three separate contacts 12d, 12e, 12f and a rotatable blade 12g, one end of which is electrically connected to the central contact 12c at all times. The other end is brought into connection with contacts 12d, 12e or 12f in accordance with whether the setting of the pointer 10 is at position 1, position "news" or position 2. Similarly, the section 12b has a central or common contact 12h and three separate contacts 12i, 12j, 12k and a rotatable blade 12L, one end of which is electrically connected to central contact 12h at all times. The other end is brought into connection with contacts 12i, 12j or 12k in accordance with whether the setting of the pointer 10 is at position 1, position "news" or position 2. While the shaft or other mehanism which causes the two switch blades to move in unison with the pointer is not specifically shown, it is symbolized by the dotted line 12m.

One side of each of the two conductor audio and video lines 16, 17, 18, 19, 20, 21, 22 and 75 is connected to a common line 12n within the block, and this is grounded. The other sides of video lines 17, 21, 75 and 22 are connected to the contacts 12c, 12d, 12e and 12f respectively of the video switch 12a, and the other sides of audio lines 16, 18, 20 and 19 are connected to the contacts 12h, 12i, 12j and 12k respectively of the audio switch 12b.

In operation, when the pointer 10 is set at position 1, the switch is therefore so set that video and audio signal energies from the No. 1 studio are transmitted through block 12 to the video and audio lines which operate the transmitter 11. When the pointer is set at position 2, the video and audio signal energies from the No. 2 studio are transmitted through block 10 to the video and audio lines which operate the transmitter 11. But when for the purposes of transmitting news information, the pointer is set at "news," the video and audio signal energies from the news room 15 are transmitted through block 12 to the video and audio lines which operate the transmitter 11.

The news room 15 comprises a control generator 23, a television camera 24, a primary timing mechanism 25, a secondary timing mechanism 26, and a news sheet mechanism 27. The control generator 23 is connected to the control console by an audio channel 20.

The control generator 23 (Fig. 4) is a control generator which selectively produces a different characteristic audio signal in accordance with whether the generator is energized by voltage from battery 54 at terminals A, by voltage from battery 55 at terminals B, or by voltage from battery 57 at terminals C in accordance with the operation of various contacts. This audio signal is delivered out over line 20. Within the control generator are three double-pole single-throw relays *23a*, *23b*, *23c*, the windings of which are connected to the terminals A, B, and C respectively. The signal is generated by an electronic oscillator triode *23d*. This has the usual cathode *23e* connected to ground line *23f* through resistor *23ga* shunted by capacitor *23gb*. One side of the filament of *23d* is connected to ground line *23f* directly and the other side through an "A" battery *23ha*. The plate circuit is driven by a "B" battery *23hb*, the negative terminal of which is connected to ground line *23f* and the positive terminal of which is connected through inductor *23i* paralleled by capacitor *23j* to the plate anode of triode *23d*. The grid is connected through inductor coil *23k* to ground line *23f*, and this inductor is suitably coupled to the inductor *23i* to cause electrical oscillation of a frequency somewhat higher than those which are to be used. Provision is made for lowering the frequency of oscillation by means of differently valued capacitors 23L, *23m*, *23n*, one side of each of which is connected through line *23o* to the plate of the oscillator, and the other sides of which can be selectively connected to ground line *23f*. For this purpose, one side of audio line 20 which is connected to ground within block 12 is also connected to ground line *23f* within the present block. This ground line is also connected to moving contact blades *23p*, *23q*, and *23r* of the relays *23a*, *23b*, and *23c* respectively, the corresponding fixed contacts of which *23s*, *23t*, and *23u* respectively are connected to those ends of capacitors 23L, *23m*, *23n* respectively which are not connected to line *23o*. At the other ends of the relays, the movable blades *23v*, *23w* and *23x* are connected in parallel to a tap on the coil *23k*, while the other corresponding fixed contacts *23y*, *23z* and *23&* respectively are connected in parallel and to the side of line 20 which is not connected to ground.

In operation, normally the oscillator triode *23d* generates an audio signal delivered between the tap on coil *23k* and ground line *23f*. But normally all relay contacts are opened and the signal therefore is not delivered to the line 20. When, however, any relay such as *23a* is caused to operate by the contact devices and batteries external to the block 23, the corresponding capacitor such as 23L is shunted across the plate to ground of the triode *23d* to lower the audio frequency of oscillation to make it of frequency value say $F_a$. At the same time the other end of the relay operates to connect the center tap on inductor *23k* to the active side of line 20. In this manner, a signal voltage of sine wave nature is impressed upon line 20, which will be of audio frequency $F_a$, $F_b$, or $F_c$ in accordance with whether distinctive signal A, B, or C is set up by the external contacts.

Circuits for changing the frequency of an oscillator are shown in U. S. Patent No. 1,607,456. Fig. 1 of this patent shows devices 69 and 45 for changing the frequency of an arc oscillator by cutting in a capacitor. U. S. Patent No. 1,610,425 shows in Fig. 10 a tuned plate circuit and inductive feedback. A switching device is also shown to change the oscillator frequency. U. S. Patent No. 1,596,251 shows a relay with two armatures in Fig. 3.

The primary timing mechanism 25 consists of a self-starting synchronous motor 28 on the shaft of which is mounted a worm gear 29 which meshes with a worm wheel 30 mounted on a shaft 40. Also mounted on the shaft 40 is a commutator 31 which is made of insulating material and is provided with a contact segment 32 and two pins 33 and 34. The pin 34 is mounted nearer the periphery of the commutator 31 than the pin 33. A 60 cycle or other suitable A. C. generator 35 is provided for supplying current to the synchronous motor 28.

Mounted adjacent to the commutator 31 is a solenoid 37 which is provided with a core 38 to which is secured a collar 39. Between the collar 39 and the solenoid 37 is mounted a coil spring 41. Normally the pin 33 engages the core 38, thus preventing the rotation of the commutator 31. The winding of the solenoid 37 is connected through a battery 42 to the contacts of a push button 43 located adjacent to the control console 12.

Also located adjacent to the commutator 31 is a second solenoid 45 which is provided with a core 46 to which is secured a collar 47. Between the collar 47 and the solenoid 45 is mounted a coil spring 48. The length of the core 46 is so proportioned that when the solenoid 45 is de-energized it will project in the path of the pin 34 but not in the path of the pin 33.

Engaging the commutator 31 are three sets of contacts 51, 52 and 53. The contacts 51 are connected in a circuit with a battery 54 to the control generator 23. The contacts 52 are connected in a circuit with a battery 55 to the control generator 23 and to the winding of a solenoid 56. The contacts 53 are connected in a circuit including the winding of the solenoid 45, a battery 57, the control generator 23, the winding of a solenoid 58 and a pair of contacts 59.

The secondary timing mechanism 26 consists of a self-starting synchronous motor 61 on the shaft of which is mounted a commutator 62 which is made of insulating material and is provided with a contact segment 63 and a pin 64. The motor 61 is connected to the A. C. source 35. The solenoid 56 is provided with a core 65 to which is secured a collar 66. Between the collar 66 and the solenoid 56 is mounted a coil spring 67. When the core 65 is fully extended it is in the path of the pin 64. The solenoid 58 is provided with a core 68, the end of which is beveled to act as a snap catch for the collar 66. Secured to the core 68 is a collar 69 between which and the solenoid 58 is mounted a coil spring 71.

Engaging the commutator 62 are two sets of contacts 73 and 74. The contacts 73 are in the video circuit 75 between the camera 24 and the control console 12 and the contacts 74 are in a circuit including the A. C. source 35 and a self-starting synchronous motor 76. Mounted on the shaft of the motor 76 is a worm gear 77 which meshes with a worm wheel 78 mounted on the shaft of a roller 79 between which and a second roller 81 passes a strip of paper 82 on which the news sheets are printed. Any number of news sheets may be printed on the paper 82, such as "News Sheet No. 1," "News Sheet No 2," "News Sheet No. 3," etc. At the end of the paper strip 82, predetermined number of blanks are provided. The paper strip 82 is wound upon a roller 83, passes between two friction rollers 84 and 85, then through a frame 86, which is located in front of the camera 24, passes between and separates the contacts 59 and then between the roller 79 and 81.

Referring to Fig. 2 the receiving system includes a television receiver 91, a loud speaker 92 and a kinescope 93. For recording and printing the news flashes a control mechanism 94 is provided together with a camera 95, a processing mechanism 96, a primary timing mechanism 97, a secondary timing mechanism 98 and a time clock 99.

The function of the control mechanism 94 (Fig. 5) is to accept the characteristic signals A, B, or C over the line 111, and selectively produce D. C. voltage over output lines 108, 187, 185 for external operation of solenoid devices, in accordance with whether distinctive signal A, B, or C is being sent. The block 94 is to be energized by a circuit closing time clock through use of line 184. Selective transmission and reception is disclosed in U. S. Patent Nos. 1,491,772, 1,491,774 and 1,522,883.

The block 94 includes a selector channel 94*a* responsive to the A signal, a selector channel 94*b* responsive to the B signal and a selector channel 94*c* responsive to the C signal. These signals correspond to the like designated signals produced by block 23 above described, which produce a sine wave audio voltage of frequency $F_a$, $F_b$ or $F_c$ at the input 111. Since all of these selector channels are of identical nature except for choices of constants of electrically selective networks, it will suffice to describe only one channel in detail.

The input of the selector 94*a* is applied between terminal 94*a*1 and the ground line 94*a*2. Input terminal 94*a*1 is connected through resistor 94*a*3 and resistor 94*a*4 to the anode of a rectifier 94*a*5, and the junction of the two resistors is joined to ground through inductor 94*a*6 parallel by capacitor 94*a*7, these being tuned to the frequency $F_a$ so that the rectifier is driven strongly only when the signal impressed upon is of frequency $F_a$. The cathode of rectifier 94*a*5 is connected through resistor 94*a*8 shunted by capacitor 94*a*9 to the ground line 94*a*2, and is connected to the grid of a relay tube 94*a*10. From a high voltage D. C. line 94*a*11, a resistor 94*a*12 is connected to the cathode of the relay tube, which in turn is connected through resistor 94*a*13 to ground line 94*a*2. Also the high voltage line is connected through the winding of a single-pole single-throw relay 94*a*14 to the plate of the relay tube. One of the output contacts of this relay is directly connected to one side of line 108, and the other is connected through a battery 94*a*15 to the other side of the line 108.

The other selector circuits are of similar nature, and the inputs, ground lines, high voltage lines are connected in parallel. For simplicity, therefore, the other circuits 94*b*, 94*c* are shown in block only.

To supply sufficient signal voltage to operate the selectors, an amplifier 94*d* is provided, with a triode 94*e*, the grid of which is connected to one end of autotransformer 94*f*, the other end of which is connected to ground line 94*g* which, of course, is also connected to the ground lines of the various selector circuits. The tap of the transformer is connected to one side of line 111, the other side of which is connected to ground line 94*g*. The cathode of the triode 94*e* is connected to ground by resistor 94*h* shunted by capacitor 94*i*. The plate anode of triode 94*e* is connected through capacitor 94*j* to the input terminals 94*a*1, 94*b*1, 94*c*1 of the selectors. It is also connected through plate resistor 94*k* to the high voltage line 94L, which is in turn connected to the high voltage lines for the individual selectors.

The electronic devices of block 94 are powerized from a power pack 94*m* which includes a transformer 94*n* with primary connected to a 60-cycle power line 94*o* when the switch contacts of the time clock are closed to connect together with the two conductors of line 184. The secondaries of the transformer are connected to supply anode power for a rectifier 94*p*, also filament power for the rectifier and for the various cathode heating filaments of the electronic tubes, which in accordance with usual practice are not shown. The output of the rectifier is smoothed by use of inductor choke 94*q*, and capacitors 94*r* and 94*s* in a well-known manner.

Since the operation of power packs and audio amplifiers is well known, their operation is not described in detail. It suffices to state that the audio signal from line 111, is amplified and impressed upon the three selector circuits. If the signal is a sustained wave of frequency $F_a$, then it is selectively transmitted beyond the circuit 94*a*6, 94*a*7 to drive the rectifier 94*a*4. After the signal has been sustained a sufficiently long time a sufficiently high voltage is developed across the grid to ground circuit of triode 94*a*10 to bring the grid potential substantially to the cathode potential of the tube, as determined by the current flowing through resistor 94*a*13 due both to current in the triode and current through resistor 94*a*12. When this occurs, the relay 94*a*14 is caused to operate and cause voltage from battery 94*a*15 to be impressed on the output line 108.

Similarly in response to signal of frequency $F_b$, the output line 187 will be powerized, and if the frequency is $F_c$, then output line 184 will be powerized.

It will be understood that the frequencies $F_a$, $F_b$ and $F_c$ may be chosen such that normally the line 111 does not carry much energy of these frequencies in comparison with the normal sound energy for the loud speaker. Thus, it is known that most of voice music energy is in the low and medium audio range. If $F_a$, $F_b$ and $F_c$ are therefore in the higher audio range, such as values 8,000, 10,000, 12,000 cycles, and the signal is of high level, then the selector circuits will be operated only in response to the control voltages desired, and not in accordance with weak harmonic constituents of the normal sound signal.

The kinescope 93, which is connected by a flexible video and power cable 101 to the receiver 91, is mounted for rotation about an axis 102 on which is mounted a worm wheel 103. Meshing with the worm wheel 103 is a worm gear 104 which is mounted on the shaft of a motor 105, which receives energy from a source 106 through a reversing switch 107. The operation of the reversing switch 107 is controlled through two channels 108 and 109 connected to the control mechanism 94. The receiver 91 is connected to the loud speaker 92 and the control mechanism 94 by an audio channel 111.

The camera 95 includes a shutter mechanism 112, a film 113 initially wound on a spool 114 and a roller 115 over which the film 113 passes. The film then enters the processing mechanism 96, passes between two friction rollers 117 and 118, over a roller 119 and into processing chamber 121. After leaving this chamber the film 113 passes between two friction rollers 122 and 123 and through a V-shaped slot 124 in a bracket 125.

Mounted on the shaft of the roller 118 is a worm wheel 126 which meshes with a worm gear 127 carried on the shaft of a self starting synchronous motor 128. Mounted on the shaft of the roller 123 is a worm wheel 131 which meshes with a worm gear 132 carried on the shaft of a self starting synchronous motor 133. The synchronous motors 133 and 128 at suitable times are supplied with current from an A. C. source 134. An arm 135 is pivoted at 136 to the casing of the processing mechanism 96. At one end of the arm 135 is mounted a roller 137 which at suitable times rides on the film 113. Mounted on but insulated from the other end of the arm 135 is a contact bar 138, which at times engages a pair of contacts 139.

The primary timing mechanism 97 comprises a self starting synchronous motor 141 to the shaft of which is secured a commutator 142 made of insulating material and provided with a contact segment 143 and a pin 144. The synchronous motor 141 is connected to the A. C. source 134. Engaging the commutator 142 are two sets of contacts 145 and 146. The contacts 145 are connected by conductors 147 and through a battery 148 to the shutter mechanism 112 of the camera 95. The contacts 146 are in a circuit 149 which includes the source of A. C. 134 and the synchronous motor 128. The synchronous motor 141 runs at the same speed as synchronous motor 61 thus driving the two commutators 142 and 62 at the same speed.

Located adjacent to the commutator 142 are two solenoids 150 and 151. The solenoid 150 is provided with a core 152 to which is secured a collar 153. Between the collar 153 and the solenoid 151 is mounted a coil spring 154. When the core 152 is fully extended it is in the path of the pin 144. The solenoid 151 is provided with a core 155 the end of which is beveled to act as a snap catch for the collar 153. Secured to the core 155 is a collar 156 between which and the solenoid 151 is mounted a coil spring 157.

The secondary timing mechanism 98 comprises a self starting synchronous motor 158 connected to the source 134. Mounted on the shaft of the motor 158 is a worm gear 159 which meshes with a worm wheel 161 which is mounted on a shaft 162. Secured to the shaft 162 is a disc 163 and a commutator 164. The commutator 164 is made of insulating material and is provided with a contact segment 165. Engaging the commutator 164 are a pair of contacts 166 which are in a circuit including the source of A. C. 134 and the synchronous motor 133.

Located adjacent to the disc 163 are two solenoids 168 and 169. The solenoid 168 is provided with a core 171 to which is secured a collar 172. Between the collar 172 and the solenoid 168 is mounted a coil spring 173. Mounted on but insulated from the collar 172 is a contact bar 174, which at suitable times engages a pair of contacts 175. Whenever the core of the solenoid 168 is extended it engages a pin 176 mounted on the disc 163.

The solenoid 169 is provided with a core 177 the end of which is beveled to act as a snap catch for the collar 172. Secured to the core 177 is a collar 178 between which and the solenoid 169 is mounted a coil spring 179. The winding of the solenoid 169 is in a circuit 181 which includes the two sets of contacts 175 and 139 and a battery 182.

The time clock 99 may be of any well known and standard construction which operates to close a circuit at a pre-set time. In this case the circuit is indicated at 184 and operates to turn on the receiver 91 and control mechanism 94 at a predetermined time. The control channel 109 is connected by a branch channel 185 to the time clock 99 where it operates to open the circuit 184, to turn off the receiver 91 and control mechanism 94 and to reset the timing mechanism 99 so that it can operate again at the next hour if so desired. The winding of the solenoid 151 is connected to the channel 185 by conductors 186. The windings of the solenoids 168 and 150 are connected to the control mechanism 94 by conductors 187 and branch conductors 188 respectively.

*Operation of Figs. 1 and 2*

In the operation of the form of the invention shown in Figs. 1 and 2 the paper strip 82 on which the news sheets are printed is partially unwound and is inserted between the rollers 84—85, passed through the frame 86 and between the rollers 79 and 81 until "News Sheet No. 1" is in position in the frame 86, as shown in Fig. 1. The video camera 24, control generator 23 and transmitter 11 are turned on and the control console indicator 10 is turned to the "News" position.

At the receiver, shown in Fig. 2, the time clock 99, which may have been set at 5 a. m. the night before, operates at that time to close the circuit through channel 184, which turns on the receiver 91 and control mechanism 94. After waiting a few minutes for the apparatus at the receiver to warm up the operator at the control console 12 presses the push button 43. This causes the energization of the solenoid 37, which in turn causes the retraction of the core 38 thus releasing the pin 33. The commutator 31 then starts to rotate in the direction of the arrow under the action of the synchronous motor 28. As the contact segment 32 engages the contacts 51 a circuit will be closed in the control generator 23 to send out a distinctive signal, designated as the "A" signal, over the audio channels 20 and 16 to the transmitter 11, which sends it as a radio "A" signal.

This distinctive audio "A" signal is picked up at the receiver 91, Fig. 2 and passes over conductors 111 to the control mechanism 94, one set of circuits of which are responsive to this particular type of signal. After a predetermined time interval, depending upon the characteristics of the audio circuits, a control signal will be sent out over the circuit 108, which will operate the switch 107 to cause the motor 105 to rotate the kinescope 93 in a clockwise direction into the position shown in dotted lines where it will automatically stop due to the action of limit switches not shown. After a sufficient length of time has passed to allow the kinescope to assume this vertical position the contact segment 32, Fig. 1, will disengage the contacts 51 and the "A" signal will stop.

As the commutator 31 continues its rotation the segment 32 will engage the contacts 52, which will close a circuit including the battery 55, control generator 23 and solenoid 56. The energization of the solenoid 56 will cause the core 65 to disengage the pin 64 allowing the commutator 62 to start rotating in the direction of the arrow under the action of the synchronous motor 61. When the core 65 moves to the right, the collar 66 will snap under the core 68 of the solenoid 58, thus holding the core 65 out of the path of the pin 64 after the solenoid 56 is deenergized.

The closing of the circuit from the contacts 52 to the control generator 23 will cause a second distinctive signal, designated as the "B" signal to be sent over the audio channels 20 and 16 to the transmitter 11, which sends it as a radio "B" signal. This distinctive audio "B" signal is picked up at the receiver 91, Fig. 2, and passes over conductors 111 to the control mechanism 94, one set of circuits of which are responsive to this particular type of signal. After a predetermined time interval, depending upon the characteristics of the audio circuits, a control signal will be sent out over the circuits 187 and 188 to energize the solenoids 168 and 150, which will remain energized for a considerable length of time.

When the solenoid 150 is energized the core 152 will be retracted and the collar 153 will snap under the core 155 of the solenoid 151 thus holding the core 152 out of the path of the pin 144. This will allow the commutator 142 to start turning in the direction of the arrow under the action of the synchronous motor 141.

When the solenoid 168 is energized the core 171 will be retracted causing the contact bar 174 to engage the contacts 175. This will close a circuit including the solenoid 169, contacts 175 and 139 and battery 182, thus energizing temporarily the solenoid 169, the core 177 of which is moved out of engagement with the collar 172. When the core 171 of the solenoid 168 is retracted it will move out of engagement with the pin 176 thus allowing the disc 163 and commutator 164 to start slowly rotating in the direction of the arrows under the action of the synchronous motor 158.

By this time the commutator 62, Fig. 1, has rotated sufficiently so that the contact segment 63 is in engagement with the contacts 73, thus closing the video circuit 75 of the camera 24. By this means a telecast of the "News Sheet No. 1" is sent out by the transmitter 11 and is received by the receiver 91, Fig. 2, and is reproduced on the screen of the kinescope 93 in the usual manner.

At this instant the commutator 142, Fig. 2, will have rotated sufficiently so that the segment 143 will engage the contacts 145. This closes the circuit through the camera shutter 112, thus operating this shutter and causing a picture of "News Sheet No. 1," as it appears on the kinescope screen, to be taken on the film 113, due allowance being made for the time of transmission.

The segment 143 of commutator 142 now moves into engagement with contacts 146 thus causing the synchronous motor 128 to start, which rotate the roller 118 in the direction of the arrow. This will cause the film 113 to be unwound from the spoon 114 and formed into a loop as indicated by the dotted line 189. After a sufficient rotation of the roller 118 to bring a new section of unexposed film 113 under the shutter 112 the segment 143 will move out of engagement with the contacts 146 thus stopping the motor 128.

When the film 113 is formed into the loop 189 the roller 137 will drop down thus rotating the arm 135 in a clockwise direction causing the contact bar 138 to move out of engagement with the contacts 139. This will break the circuit through the solenoid 169, the core 177 of which will now engage the collar 172 thus holding the core 171 of solenoid 168 out of the path of the pin 176 after the "B" signal has subsequently ceased and the solenoid 168 has been deenergized.

Shortly thereafter the segment 32 on the commutator 31, Fig. 1, will move out of engagement with the contacts 52 thus stopping the transmission of the "B" signal and deenergizing the solenoid 56. The core 65 of this solenoid will, however, be held out of the path of the pin 64 due to the locking action of the core 68 on the collar 66.

On the cessation of the "B" signal in the receiver 91 the solenoids 150 and 168 will be deenergized, but their cores 152 and 171 will be held in the retracted position due to the locking action of the cores 155 and 177 on the collars 153 and 172 respectively. Thus the commutators 62, 142 and 164 will continue to rotate at their respective speeds.

Segment 32 on commutator 31 now engages contacts 53 and pin 34 comes up against core 46 of solenoid 45 thus stopping rotation of commutator 31. The circuit including the contacts 53 and solenoids 45 and 58 is not closed, however, due to the fact that the contacts 59 are separated by the paper strip 82.

The segment 63 on commutator 62 now engages contacts 74 closing a circuit from the source 35 to the synchronous motor 76 which starts rotating the roller 79 in the direction of the arrow. This causes the paper strip 82 to move to the left until "News Sheet No. 2" takes its position in the frame 86, at which time the segment 63 will move out of engagement with the contact 74 thus breaking the circuit to the motor 76.

As the commutator 62 continues to rotate, the segment 63 will again engage the contacts 73 thus closing the video circuit 75 of the camera 24. This causes a telecast of "New Sheet No. 2" to be sent out by the transmitter 11 and received by the receiver 91 from which it passes to the kinescope 93 and is reproduced on the screen thereof. At this instant segment 143 of commutator 142 will engage contacts 145 to operate the shutter 112 of camera 95 causing a picture of "News Sheet No. 2" to be taken on film 113.

The segment 143 now engages contacts 146 causing the motor 128 to start which in turn causes the roller 118 to rotate in the direction of the arrow. This will cause the film 113 to be unwound from the spool 114 and added to the loop 189.

Segment 165 on the slowly rotating commutator 164 will now engage contacts 166 closing a circuit from the source 134 to the motor 133 which causes the roller 123 to rotate in the direction of the arrow. This operation causes the film 113 to be drawn down into the processing chamber 121, some of the slack being taken out of the loop 189. Segment 63 of commutator 62 now engages contacts 74 to pull "News Sheet No. 3" into position in the frame 86 in a manner already described.

The sequence of operations now repeats itself, a telecast of "News Sheet No. 3" being sent out by transmitter 11, received by receiver 91, photographed by camera 95 and the exposed film 113 added to the loop 189. This sequence of operations continues until all the "News Sheets" have been photographed on film 113. As previously mentioned the paper strip 82 is provided with a number of blank spaces after the last "News Sheet." These blank spaces are also photographed on the film 113.

As the end of the paper strip 82 passes out of the frame 86 it will allow the contacts 59 to become engaged. This will close a circuit including the solenoids 58 and 45 and the control generator 23. When the solenoid 58 is energized, its core 68 will disengage the collar 66 allowing the core 65 of solenoid 56 to be extended into the path of the pin 64 thus stopping the rotation of commutator 62.

The closing of this circuit to the control generator 23 will cause a third distinctive signal, designated as the "C" signal to be sent over the audio channels 20 and 16 to the transmitter 11, which sends it as a radio "C" signal. This distinctive audio "C" signal is picked up at the receiver 91 and passes over conductors 111 to the control mechanism 94, one set of circuits of which are responsive to this particular type of signal. A control signal will then be sent out over the circuits 109, 185 and 186.

The control signal going out over circuit 109 will operate the reversing switch 107 so as to run the motor 105 in reverse to cause the kinescope 93 to return to its initial position, as shown in full lines, where it will be stopped by limit switches not shown. The control signal sent out over circuit 185 operates to reset the mechanism in the time clock 99, so that the circuit 184 will be opened, thus shutting off the receiver 91 and control mechanism 94. The time clock 99 will then be ready to function again at the next preset time. The control signal sent out over circuit 186 energizes solenoid 151, the core 155 of which when retracted releases the collar 153, allowing the core 152 of the previously deenergized solenoid 150 to be extended in the path of the pin 144, thus stopping the rotation of commutator 142.

The energization of solenoid 45, Fig. 1, will cause its core to be retracted thus releasing pin 34 and allowing the commutator 31 to slowly rotate in the direction of the arrow. After a predetermined time interval, the segment 32 will disengage the contacts 53 thus breaking the circuit to the solenoids 45 and 58 and to the control generator 23. This will cause a cessation of the "C" signal, which will deenergize the circuits 109, 185 186, Fig. 2. The commutator 31 will continue to rotate until the pin 34 engages the core 38 of solenoid 37 when it will be stopped.

During this time while the various "News Sheets" have been telecast and photographed the commutator 164 has been slowly rotating, which causes the segment 165 to engage the contacts 166 at regular intervals, for example, one minute. When this occurs the motor 133 is energized from the source 134 for a predetermined time interval causing the roller 123 to pull the film 113 into the processing chamber 121 an amount equal to one exposed section of film each time the segment 165 engages the contacts 166. During the time the film is in the processing chamber 121 it will be developed and printed in a manner well known in the art. The printed film will then pass between the rollers 122 and 123 and through the slot 124 in the bracket 125.

This procedure continues until the slack in the loop 189 of the film 113 has been taken up and the film assumes the position shown in full lines in Fig. 2. When this occurs the film 113 will lift the roller 137 into the position shown in Fig. 2 at which time the contact bar 138 will engage the contacts 139 thus closing a circuit through the solenoid 169 and producing a "D" signal. When this solenoid is energized the core 177 will be moved out of engagement with the collar 172, allowing the core 171 of solenoid 168 to be extended in the path of the pin 176 thus stopping the rotation of commutator 164. Thus the "D" signal is sent automatically at the end of the processing of the film 113 and completes the cycle of operations at the receiving system shown in Fig. 2.

The printed film with the "News Sheets" thereon will extend through the slot 124 as indicated at 191. That portion of the film 113 between the roller 115 and the slot 124 will be blank film made up of images of the blank sheets following the "News Sheets." When it is desired to read the "News Sheets" the film, as indicated at 191, is torn off at the slot 124.

The operator at the control console 12 now momentarily depresses the push button 43 energizing the solenoid 37. This causes the core 38 to be retracted out of engagement with the pin 34 allowing the commutator 31 to rotate in the direction of the arrow under the action of the motor 28. The commutator 31 continues to rotate until the pin 33 engages the core 38 when it is stopped, thus completing the cycle of operations at the transmitting system depicted in Fig. 1.

It is seen from the foregoing description of the operation that the commutator 31 makes only one complete revolution during an entire cycle and controls the transmission and coordination of the "A," "B" and "C" signals with the transmitter mechanism. Commutator 62 rotates from the start of the "B" signal to the start of the "C" signal and makes one complete revolution for the transmission of each picture. Commutator 142 rotates from the time the "B" signal is received to the time the "C" signal is received and rotates at the same speed as commutator 62 and controls the operation of the camera shutter and advancing the film for each picture taken. Commutator 164 rotates from the time the "B" signal is received to the time the "D" signal is produced automatically at the end of the film processing operation.

The mechanism is now in its initial condition and ready for a second newscast at a predetermined time after the first, for example at six o'clock. When it is time for the second newscast a new strip of paper 82 is placed in position, the time clock 99 operates to energize the receiver 91 and control mechanism 94 and the operator at the control console 12 depresses the push button 43. This initiates a new set of operations similar to that already described and a new set of "News Sheets" are printed. This procedure may go on at predetermined times during the day and night, so that up to the minute news is available at those times.

If it is desired to operate the system for television purposes between the newscasts the indicator 10 at the control console 12 is turned to either studio 1 or studio 2, the transmitter 11 and receiver 91 are turned on and the telecast will appear on the screen of the kinescope 93 and the accompanying sound will be produced in the loud speaker 92 in the usual manner.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. A system for utilizing television type transmission for the transmission and reception of a series of facsimiles, comprising television transmission apparatus including a television camera, and transmission means to transmit televised pictures to a remote point, means feeding a film containing a series of pictures to be televised in sequence through the field of said camera, timing means operable continuously when released to alternately actuate said camera to scan a picture and then advance said film to position the next picture in the field of said camera for scanning, a control signal generator and means to cause said generator to transmit a control signal and to release said timing means in timed relationship, and a receiver at a remote point responsive to the television signal and having a kinescope screen on which said pictures are reproduced, means passing a sensitized film past the field of said screen, timed means operable when released to alternately expose said film to the kinescope screen and then advance said film to receive a second picture, means responsive to said control signal to release said last timing means for operation in synchronism with said first timing means, and means for processing said exposed film.

2. In a system, as set forth in claim 1, means at the transmitter operable by said first film at the completion of the desired picture series to transmit a second control signal and to stop the first timing means, and means at the receiver responsive to said second control signal to stop the receiver timing means while allowing the processing means to continue.

3. In a system, as set forth in claim 2, automatic means at the receiver operable at the completion of the processing operation to stop said processing means.

4. In a system, as set forth in claim 1, means mounting said kinescope for shifting between a screen viewing position for normal television use and a position to register with said film for recording, reversible means to shift said kinescope between said positions, and means responsive to predetermined received control signals to actuate said shifting means.

5. In a television receiving system, a kinescope having a screen, means feeding a sensitized film past the field of said screen for printing therefrom, and timed means to alternately actuate said kinescope to project a picture onto said film and then feed an unexposed part of said film to the field of said screen, and means for automatically processing the exposed film.

6. In a television receiver, as set forth in claim 5, means responsive to a predetermined received signal to start the operation of said timed means.

7. In a television receiver, as set forth in claim 6, means responsive to a second predetermined received signal to stop said timed means.

8. In a television receiver, as set forth in claim 7, means operable at the completion of the processing to stop the processing means.

JOHN HAYS HAMMOND, Jr.

References Cited in the file of this patent

UNITED STATES PATENTS

| Number | Name | Date |
|---|---|---|
| 2,275,898 | Goldsmith | Mar. 10, 1942 |
| 2,287,307 | Herbst | June 23, 1942 |
| 2,420,029 | Brady | May 6, 1947 |
| 2,480,423 | Simmon | Aug. 30, 1949 |
| 2,525,891 | Garman | Oct. 17, 1950 |